US008174520B2

(12) United States Patent
Lin

(10) Patent No.: US 8,174,520 B2
(45) Date of Patent: May 8, 2012

(54) DRIVING CIRCUIT OF AN LCD PANEL AND DATA TRANSMISSION METHOD THEREOF

(75) Inventor: Chia-Liang Lin, Tainan County (TW)

(73) Assignee: Himax Technologies Limited, Fonghua, Xinshi Dist., Tainan (TW)

( * ) Notice: Subject to any disclaimer, the term of this patent is extended or adjusted under 35 U.S.C. 154(b) by 343 days.

(21) Appl. No.: 12/549,393

(22) Filed: Aug. 28, 2009

(65) Prior Publication Data

US 2011/0050679 A1 Mar. 3, 2011

(51) Int. Cl.
*G06F 3/038* (2006.01)

(52) U.S. Cl. ......................... 345/214; 345/100; 345/103

(58) Field of Classification Search ........................ None
See application file for complete search history.

(56) References Cited

U.S. PATENT DOCUMENTS 7,372,381 B2 * 5/2008 Chan ............................ 341/100

* cited by examiner

*Primary Examiner* — Muhammad N Edun
(74) *Attorney, Agent, or Firm* — Winston Hsu; Scott Margo

(57) ABSTRACT

A driving circuit includes a receiving module, a data mapping module, a shift register module, a plurality of output channels, and a switching module. The receiving module receives data from a first number of parallel inputs. The data mapping module is coupled to the receiving module for mapping the data from the first number of parallel inputs to a second number of data buses according to a bus mode signal. The shift register module is used for generating a plurality of shift control signals. Each of the output channels latches data on the data buses based on the corresponding shift control signal. The switching module is connected between the shift register module and the output channels for outputting the shift control signals to the plurality of output channels according to the bus mode signal.

10 Claims, 5 Drawing Sheets

DRIVING CIRCUIT OF AN LCD PANEL AND DATA TRANSMISSION METHOD THEREOF

BACKGROUND OF THE INVENTION

1. Field of the Invention

The present invention relates to a source driver of an LCD panel, and more particularly, to a source driver supporting a plurality of bus modes.

2. Description of the Prior Art

A liquid crystal display (LCD) has advantages of low radiation, light weight and low power consumption. Thus, the LCD has gradually replaced conventional cathode ray tube (CRT) displays, and is widely used in various information technology products, such as a notebook computer, a personal digital assistant (PDA), a mobile phone, etc. In general, the LCD utilizes a timing controller to generate data signals corresponding to images being displayed, control signals, and clock signals needed to drive the LCD panel. Then, source drivers of the LCD generate driving signals of the LCD panel according to the data signals, the control signals, and the clock signals. In order to suppress noise and reduce power consumption, data transmitted from the timing controller to the source drivers through data buses are usually in the form of differential signals. Common data transmission interfaces include a reduced swing differential signal (RSDS) interface, a mini low voltage differential signal (mini-LVDS), and so on.

There are several bus modes included in the mini-LVDS interface, for example, 5-pair mode and 6-pair mode are the most common bus modes. At present, however, a source driver chip with the mini-LVDS interface can only support 5-pair mode or 6-pair mode. Thus, the source driver chip with the mini-LVDS interface supporting 5-pair mode can not be applied to 6-pair mode, which results in manufacturing cost waste and restriction of applications.

SUMMARY OF THE INVENTION

It is therefore one of the objectives of the claimed invention to provide a driving circuit and a related data transmission method to solve the abovementioned problems.

According to one embodiment, a driving circuit is provided. The driving circuit includes a receiving module, a data mapping module, a shift register module, a plurality of output channels, and a switching module. The receiving module receives data from a first number of parallel inputs. The data mapping module is coupled to the receiving module for mapping the data from a first number of parallel inputs to a second number of data buses according to a bus mode signal. The shift register module is used for generating a plurality of shift control signals. Each of the output channels latches data on the data buses based on the corresponding shift control signal. The switching module is connected between the shift register module and the output channels for outputting the shift control signals to the output channels according to the bus mode signal. The driving circuit is a source driver of an LCD panel. The driving circuit supports a mini-LVDS interface with a plurality of bus modes including at least 5-pair mode and 6-pair mode.

According to another embodiment, a data transmission method is provided. The data transmission method includes receiving data from a first number of parallel inputs; mapping the data from the first number of parallel inputs to a second number of data buses according to a bus mode signal; generating a plurality of shift control signals; outputting the shift control signals to the plurality of output channels according to the bus mode signal; and respectively latching data on the data buses based on the corresponding shift control signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, hardware manufacturers may refer to a component by different names. This document does not intend to distinguish between components that differ in name but in function. In the following discussion and in the claims, the terms “include”, “including”, “comprise”, and “comprising” are used in an open-ended fashion, and thus should be interpreted to mean “including, but not limited to . . . ”. The terms “couple” and “coupled” are intended to mean either an indirect or a direct electrical connection. Thus, if a first device couples to a second device, that connection may be through a direct electrical connection, or through an indirect electrical connection via other devices and connections.

Figure 1:
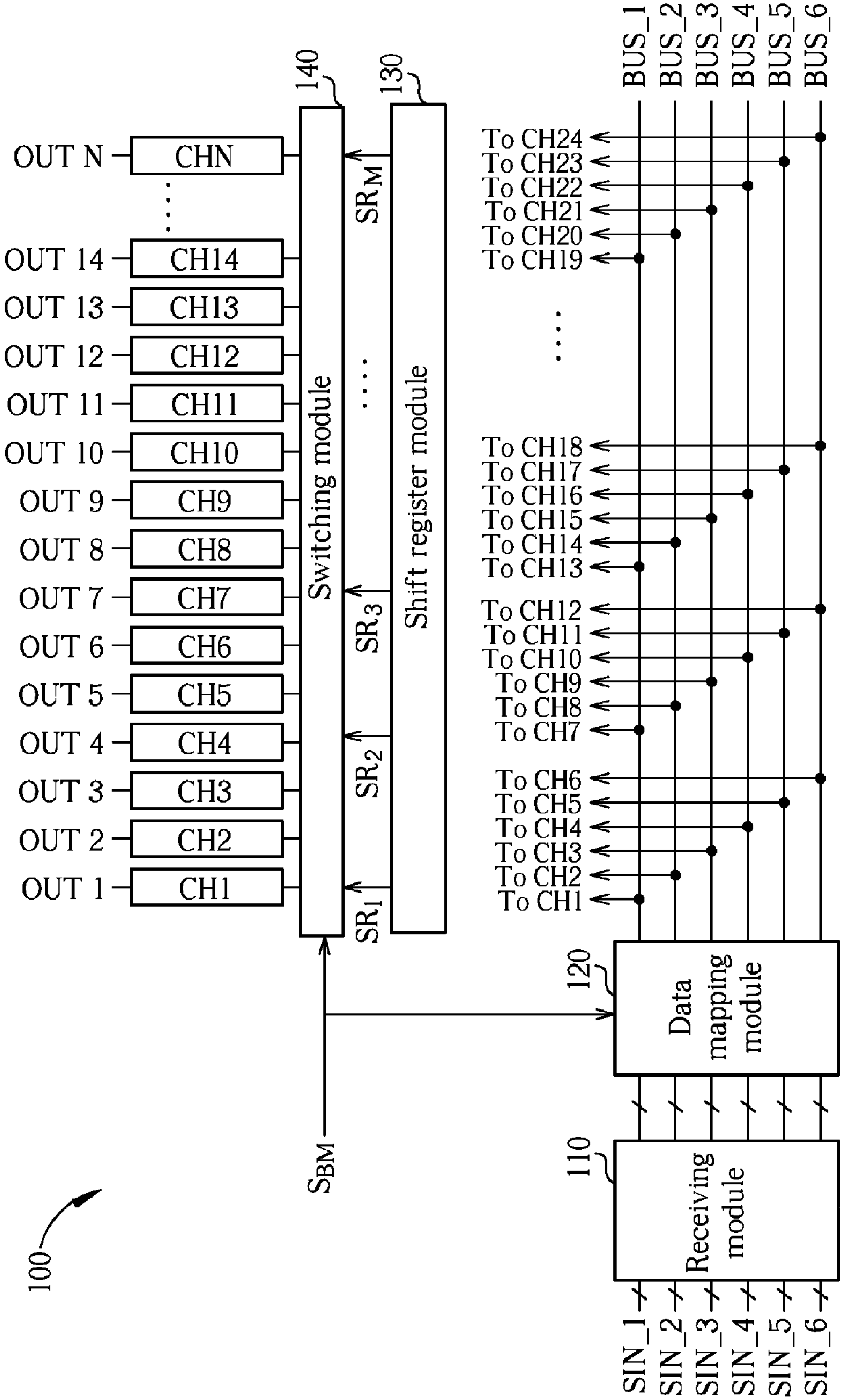
FIG. 1 is a block diagram of a driving circuit according to an embodiment of the present invention.

FIG. 1 is a block diagram of a driving circuit 100 according to an embodiment of the present invention. The driving circuit 100 can be a source driver of an LCD panel, but is not limited to this only and can be a driving circuit of another type of display. As shown in FIG. 1, the driving circuit 100 includes, but is not limited to, a receiving module 110, a data mapping module 120, a shift register module 130, a switching module 140, and a plurality of output channels CH1~CHN. The output channels have output nodes OUT1~OUTN. The receiving module 110 receives data from a first number A of parallel inputs SIN_1~SIN_A on the input buses. The mapping module 120 is coupled to the receiving module 110 for mapping the data from the first number A of parallel inputs SIN_1~SIN_A to a second number B of data buses BUS_1~BUS_B according to a bus mode signal $S_{BM}$. The shift register module 130 generates a plurality of shift control signals $SR_1$~$SR_M$. The switching module 140 is connected between the shift register module 130 and the output channels CH1~CHN. The switching module 140 selectively outputs the shift control signals $SR_1$~$SR_M$ to the plurality of output channels CH1-CHN according to the bus mode signal $S_{BM}$. Each of the plurality of output channels CH1~CHN latches data on one corresponding data buses BUS_1~BUS_B based on the correspondingly received shift control signal.

The driving circuit 100 is suitable for a data transmission interface supporting a plurality of bus modes. The bus mode signal $S_{BM}$ represents a bus mode of the data transmission interface of the driving circuit 100 and is used for controlling operations of the data mapping module 120 and the switching module 140.

Each bus mode represents the number of parallel inputs and the number of data buses. In one bus mode according to one embodiment, the first number of the parallel inputs is smaller than the second number of the data buses. The data mapping module 140 maps the first number of the parallel inputs to the second number of the data buses, such that the output channels CH1~CHN latch the corresponding data from the data buses BUS_1~BUS_B based on the shift control signals outputted by the switching module 140.

In one embodiment, the driving circuit 100 supports a mini low voltage differential signal (mini-LVDS) interface for the parallel inputs, but this should not be considered as a limitation of the present invention. The mini-LVDS interface supports a plurality number of input bus, such as 5-pair input buses or 6-pair input buses. Certainly, people skilled in the art will readily appreciate that adopting other number of input buses of the mini-LVDS interface to the driving circuit 100 is feasible.

Taking a first bus mode having 6-pair input buses and 6-pair data buses as examples for illustration, that is, the first number A is 6, and the second number B is 6. The receiving module 110 receives data from six parallel inputs SIN_1~SIN_6 on the 6-pair input buses. At this time, the mapping module 120 directly passes the six parallel inputs SIN_1~SIN_6 to the six data buses BUS_1~BUS_6.

In a second bus mode having 5-pair input buses and 6-pair data buses, that is, the first number A is 5 and the second number B is 6. The receiving module 110 receives data from five parallel inputs SIN_1~SIN_5 on 5-pair input buses. At this time, the mapping module 120 maps the five parallel inputs SIN_1~SIN_5 to six data buses BUS_1~BUS_6. The operations of the data mapping module 120 and the switching module 140 of the driving circuit 100 will be explained in detail in the following embodiments.

The driving circuit chip implemented by the driving circuit 100 disclosed in the present invention can support different number of input buses. Therefore, the manufacturing cost is effectively reduced.

Figure 2A:
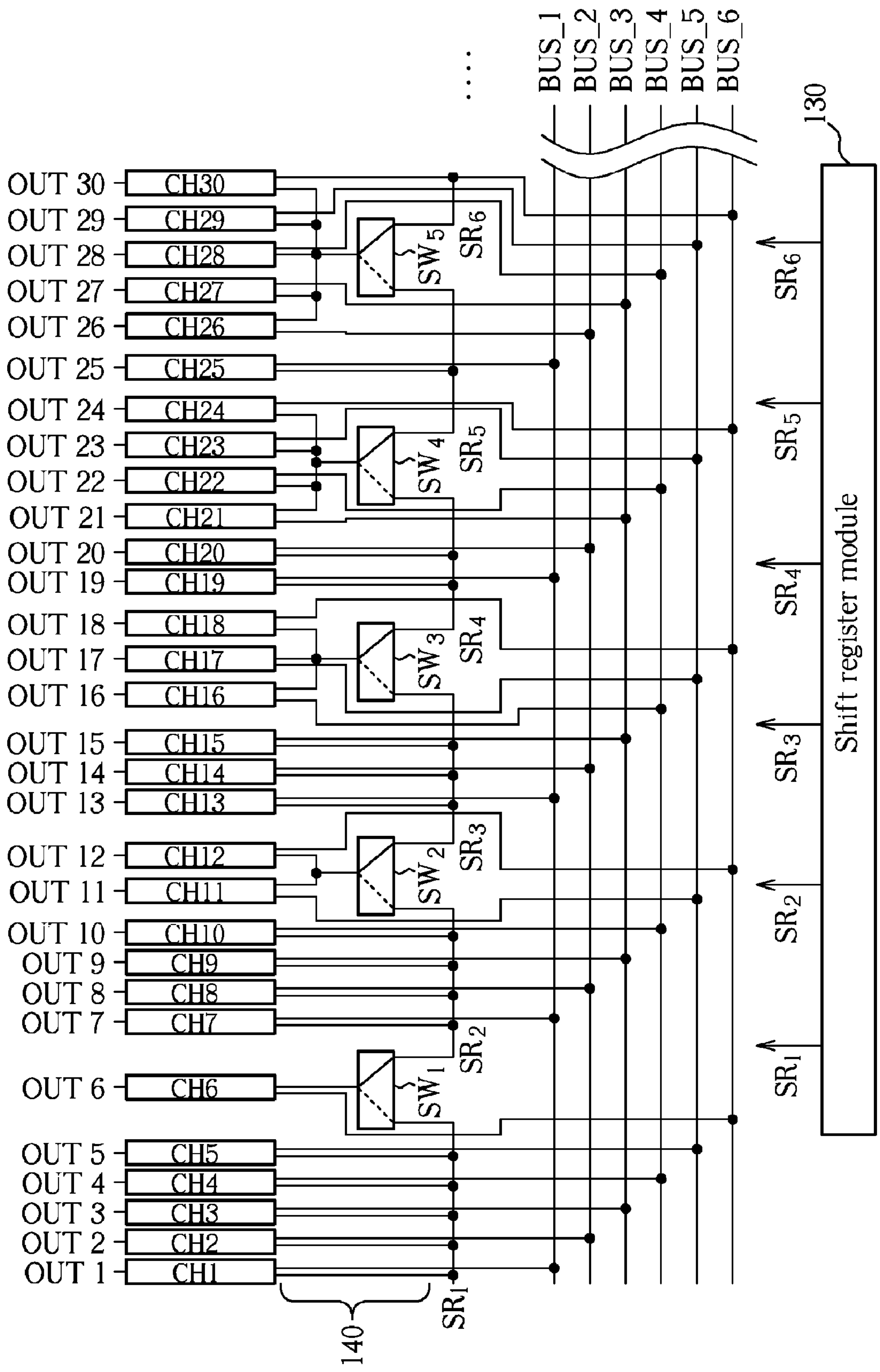
FIG. 2A and FIG. 2B are diagrams showing the detailed circuit architecture of the driving circuit shown in FIG. 1.
Figure 2B:
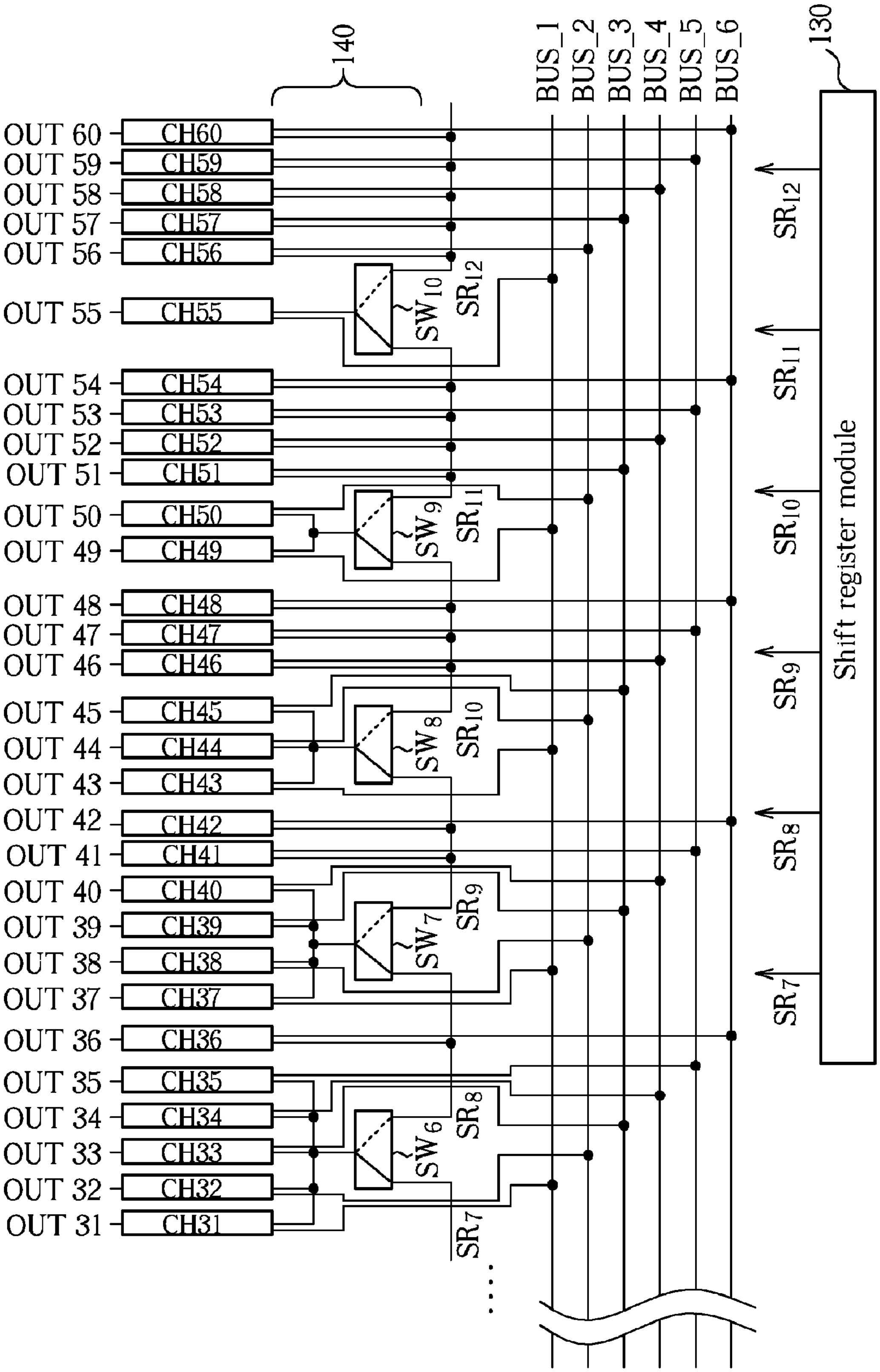

In order to implement the driving circuit chip with such circuit architecture, two issues must be solved first: the controls on the shift registers and the data mapping manner. FIG. 2A and FIG. 2B are diagrams showing the detailed circuit architecture of the driving circuit 100 shown in FIG. 1 according to an embodiment of the present invention. In this embodiment, the driving circuit 100 supports two bus modes: the first bus mode for 6-pair input buses, and the second bus mode for 5-pair input buses. The switching module 140 includes selecting switches $SW_1$~$SW_{10}$. As shown in FIG. 2A and FIG. 2B, every sixty output channels is delimited into the same group, based on the number of the data buses. For example, the sixty output channels CH1~CH60 are viewed as the $1^{st}$ group, as is shown in FIG. 2A and FIG. 2B. When the driving circuit 100 is used in the first bus mode, all of the selecting switches $SW_1$~$SW_{10}$ are switched to the dotted line; when the driving circuit 100 is used in the second bus mode, all of the selecting switches $SW_1$~$SW_{10}$ are switched to the solid line.

In the first bus mode for six input buses, every shift control signal is inputted to six output channels via the switching module 140. For example, the first shift control signal $SR_1$ controls the six output channels CH1~CH6 and the second shift control signal SR2 controls the six output channels CH7~CH12. At this time, the first selecting switch $SW_1$ connects the shift control signal $SR_1$ to the output channel CH6, the second selecting switch $SW_2$ connects the shift control signal $SR_2$ to both the output channels CH11 and CH12, and so on.

In the second bus mode for five input buses, every shift control signal is connected to five output channels via the switching module 140. For example, the first shift control signal $SR_1$ controls the five output channels CH1~CH5 and the second shift control signal SR2 controls the five output channels CH6~CH10. At this time, the first selecting switch $SW_1$ connects first shift control signal $SR_1$ to the output channel $OUT_6$, the second selecting switch $SW_2$ connects second shift control signal SR2 to both the output channels CH11 and CH12, and so on.

By means of the switching module 140 and the data mapping module 120, the driving circuit 100 is capable of supporting a plurality of bus modes. That is, the driving circuit 100 can be used in several kinds of interfaces, with different number of input buses, without the necessity of modifying the internal circuit. Please note that the selecting switches can be disposed between shift registers of the shift register module, which will not affect the height of the driving circuit chip. But this should not be a limitation of the present invention, and those skilled in the art should appreciate that various modifications of the location of the selecting switches may be made. In addition, the circuit architecture of this embodiment that has delimited sixty output channels into a group has an advantage of symmetry and is easy to be implemented.

Figure 3:
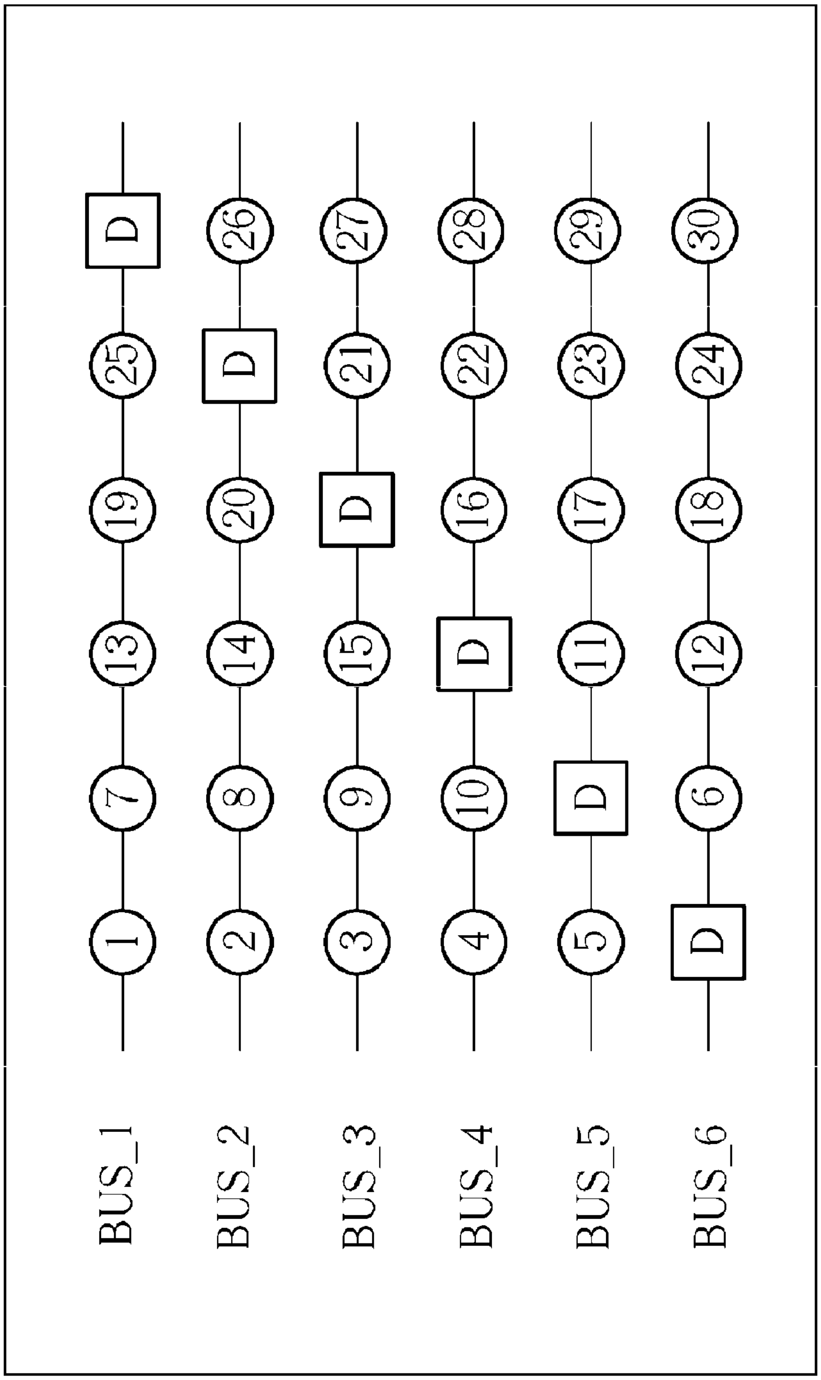
FIG. 3 is a diagram illustrating how the data mapping module shown in FIG. 1 works according to an embodiment of the present invention.

FIG. 3 is a diagram illustrating how the data mapping module 120 operates according to the first embodiment of the present invention. Taking a 5-to-6 mapping for example, the data mapping module 120 maps the data from five parallel inputs SIN_1-SIN_5 to six data buses BUS_1-BUS_6 according to the bus mode signal $S_{BM}$. During a first period $T_1$, the data buses BUS_1-BUS_5 are filled sequentially and the data bus BUS_6 is dummy, denoted as "D". During a second period $T_2$, the data bus BUS_6 is filled first and then the data buses BUS_1-BUS_4 are filled while the data bus BUS_5 is dummy. The rest can be deduced by analogy. After thirty data have been filled, a cycle is completed, completing the 5-to-6 mapping. In other words, the data mapping module 120 maps data received by the receiving module 110 to the data buses BUS_1-BUS_6 cyclically.

The embodiment above is presented merely for describing features of the present invention, and should not be considered to be a limitation of the scope of the present invention. Certainly, people skilled in the art will readily appreciate that various modifications of the data mapping module 120 may be made. For example, the 5-to-6 mapping can also be applied to a circuit architecture with opposite direction. At this time, the data sequence is inverted, and this should also belong to the scope of the present invention.

By collating the circuit architecture shown in FIG. 2A and FIG. 2B together with the mapping manner shown in FIG. 3, the driving circuit 100 disclosed in the present invention is capable of supporting different interfaces, such as the mini-LVDS interface, with different number of input buses. But the present invention is not limited to 5-pair input buses and 6-pair input buses only, and can be expanded to be applied to other number of input buses and data buses, which should also belong to the scope of the present invention.

Figure 4:
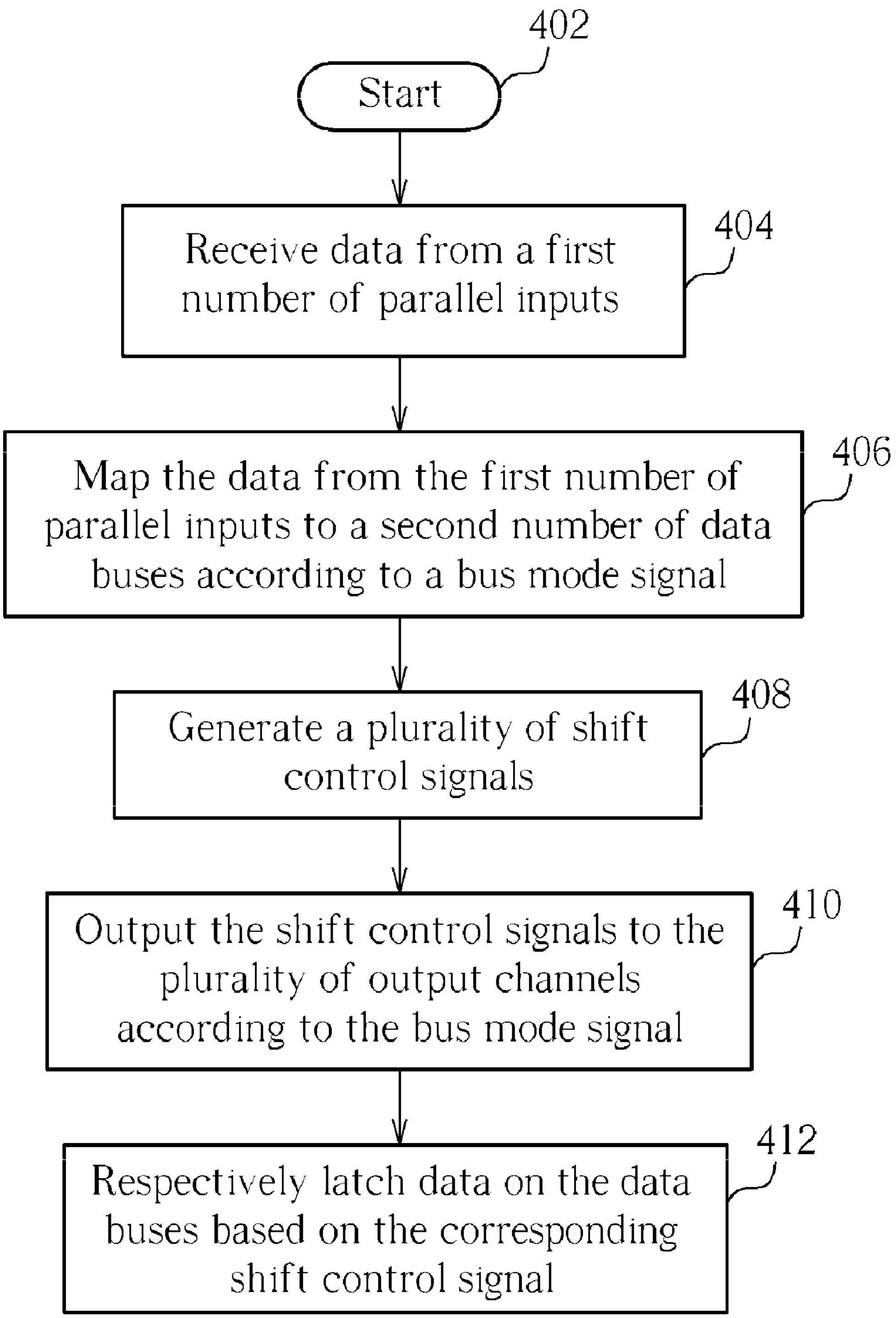
FIG. 4 is a flowchart illustrating a data transmission method according to an exemplary embodiment of the present invention.

Please refer to FIG. 4. FIG. 4 is a flowchart illustrating a data transmission method according to an exemplary embodiment of the present invention. Please note that the following steps are not limited to be performed according to the sequence shown in FIG. 4 if a roughly identical result can be obtained. The method includes the following steps:

Step 402: Start.

Step 404: Receive data from a first number of parallel inputs.

Step 406: Map the data from the first number of parallel inputs to a second number of data buses according to a bus mode signal.

Step 408: Generate a plurality of shift control signals.

Step 410: Output the shift control signals to the plurality of output channels according to the bus mode signal.

Step 412: Respectively latch data on the data buses based on the corresponding shift control signal.

The descriptions of the steps shown in FIG. 4 have already been detailed in the embodiments above, and further description is omitted here for brevity.

Note that, the method shown in FIG. 4 is just a practicable embodiment, not a limiting condition of the present invention. The order of the steps merely represents a preferred embodiment of the method of the present invention. In other words, the illustrated order of steps can be changed based on the conditions, and is not limited to the above-mentioned order.

The abovementioned embodiments are presented merely for describing features of the present invention, and in no way should be considered to be limitations of the scope of the present invention. In summary, the present invention provides a driving circuit capable of supporting a data transmission interface with a plurality of bus modes and related data transmission methods. By adding the plurality of selecting switches $SW_1$-$SW_P$ into the circuit architecture together with the mapping manner disclosed in the present invention, the driving circuit 100 can support the mini-LVDS interface switching between a plurality of bus modes (such as 5-pair mode and 6-pair mode). Therefore, not only can the manufacturing cost be substantially reduced but also the applications are not restricted. In addition, the driving circuit architecture disclosed in the present invention is suitable for applications with 450/630/645/720 output channels. The number of output channels is not limited in the present invention.

Those skilled in the art will readily observe that numerous modifications and alterations of the device and method may be made while retaining the teachings of the invention.

What is claimed is:

1. A driving circuit, comprising:
- a receiving module, for receiving data from a first number of parallel inputs;
- a data mapping module, coupled to the receiving module, for mapping the data from the first number of parallel inputs to a second number of data buses according to a bus mode signal;
- a shift register module, for generating a plurality of shift control signals;
- a plurality of output channels, each latching data on the data buses based on the corresponding shift control signal; and
- a switching module, connected between the shift register module and the output channels, for outputting the shift control signals to the output channels according to the bus mode signal;
- wherein the first number is smaller than the second number, and the data mapping module maps the first number of the parallel inputs to the second number of the data buses, such that the output channels latch the corresponding data based on the shift control signals outputted by the switching module.

2. The driving circuit of claim 1, being a source driver of an LCD panel.

3. The driving circuit of claim 1, wherein the driving circuit supports a mini low voltage differential signal (mini-LVDS) interface.

4. The driving circuit of claim 3, wherein the driving circuit supports the mini-LVDS interfaces of different number of input buses.

5. The driving circuit of claim 4, wherein the number of the input buses can be five or six.

6. A data transmission method, comprising:
- receiving data from a first number of parallel inputs;
- mapping the data from the first number of parallel inputs to a second number of data buses according to a bus mode signal;
- generating a plurality of shift control signals;
- outputting the shift control signals to the plurality of output channels according to the bus mode signal; and
- respectively latching data on the data buses based on the corresponding shift control signal;
- wherein the second number is greater than the first number, and the step of mapping the data from the first number of parallel inputs to a second number of data buses comprises mapping the data to the data buses cyclically.

7. The data transmission method of claim 6, wherein the method supports a mini-LVDS interface.

8. The data transmission method of claim 6, wherein the method can support the mini-LVDS interfaces of different numbers of input buses.

9. The data transmission method of claim 8, wherein the input buses can be 5-pair and 6-pair.

10. A driving circuit, comprising:
- a receiving module, for receiving data from a first number of parallel inputs;
- a data mapping module, coupled to the receiving module, for mapping the data from the first number of parallel inputs to a second number of data buses according to a bus mode signal, wherein the second number is greater than the first number, and the data mapping module maps data received by the receiving module to the data buses cyclically;
- a shift register module, for generating a plurality of shift control signals;
- a plurality of output channels, each latching data on the data buses based on the corresponding shift control signal; and
- a switching module, connected between the shift register module and the output channels, for outputting the shift control signals to the output channels according to the bus mode signal.

* * * * *